US009250922B2

(12) United States Patent
Barrett (10) Patent No.: US 9,250,922 B2
(45) Date of Patent: Feb. 2, 2016

(54) METHOD AND APPARATUS FOR PREFETCHING PERIPHERAL DEVICE DRIVERS FOR SMART PHONES AND OTHER CONNECTED DEVICES PRIOR TO HLOS BOOT

(71) Applicant: QUALCOMM Incorporated, San Diego, CA (US)

(72) Inventor: Michael G. Barrett, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/780,353

(22) Filed: Feb. 28, 2013

(65) Prior Publication Data

US 2014/0244990 A1     Aug. 28, 2014

(51) Int. Cl.
G06F 9/00 (2006.01)
G06F 15/177 (2006.01)
G06F 9/44 (2006.01)
G06F 11/14 (2006.01)

(52) U.S. Cl.
CPC .......... *G06F 9/4411* (2013.01); *G06F 11/1417* (2013.01)

(58) Field of Classification Search
CPC ..................... G06F 9/4411; G06F 11/1417
See application file for complete search history.

(56) References Cited

U.S. PATENT DOCUMENTS

| | | | |
|---|---|---|---|
| 7,103,914 B2 | 9/2006 | Focke et al. | |
| 7,409,537 B2 | 8/2008 | Tsang | |
| 7,461,247 B2 | 12/2008 | Veen et al. | |
| 7,509,401 B2 | 3/2009 | Takamoto et al. | |
| 2005/0149713 A1 | 7/2005 | Rothman et al. | |
| 2006/0116208 A1* | 6/2006 | Chen et al. ........................ | 463/43 |
| 2008/0005551 A1 | 1/2008 | Swanson et al. | |
| 2008/0209198 A1 | 8/2008 | Majni et al. | |
| 2011/0078428 A1* | 3/2011 | Hamid ............................. | 713/2 |
| 2012/0060047 A1 | 3/2012 | Cuoq | |

(Continued)

FOREIGN PATENT DOCUMENTS

| | | |
|---|---|---|
| CN | 102023882 A | 4/2011 |
| CN | 102446120 A | 5/2012 |

(Continued)

OTHER PUBLICATIONS

Partial International Search Report—PCT/US2014/016530—ISA/EPO—May 26, 2014 (5 pages).

(Continued)

*Primary Examiner* — Jaweed A Abbaszadeh
*Assistant Examiner* — Xuxing Chen
(74) *Attorney, Agent, or Firm* — Arent Fox LLP (57) ABSTRACT

Apparatus and methods for booting a user equipment are described. A device boot of the user equipment may be performed. Peripherals and associated drivers for the user equipment may be configured. A high-level operating system (HLOS) may be booted. The configuring may occur before the booting of the HLOS. Apparatus and methods for loading peripheral device drivers for a user equipment are also described. Peripherals that can be associated with a user equipment may be determined. Drivers for the determined peripherals may be loaded. The loaded drivers may be associated with a high-level operating system (HLOS) architecture regardless of a type of user equipment on which the HLOS is provided.

20 Claims, 8 Drawing Sheets

(56) References Cited

U.S. PATENT DOCUMENTS

2012/0278796 A1 11/2012 Sandlin et al.
2012/0302346 A1* 11/2012 Layne et al. .................. 463/36

FOREIGN PATENT DOCUMENTS

| EP | 1 736 871 A2 | 12/2006 |
| TW | 428143 B | 4/2001 |
| TW | 515937 B | 1/2003 |
| TW | 588284 B | 5/2004 |
| TW | 594567 B | 6/2004 |
| TW | I276967 B | 3/2007 |
| TW | I309803 B | 5/2009 |
| TW | 201118733 A | 6/2011 |

OTHER PUBLICATIONS

International Search Report and Written Opinion—PCT/US2014/016530—ISA/EPO—Jul. 22, 2014. (14 total pages).
Taiwan Search Report—TW103106331—TIPO—Jun. 21, 2015. (2 total pages).

* cited by examiner

| Section | Peripheral Type | Peripheral No. | Peripheral Device Driver Identifier | Peripheral Identifier |
|---|---|---|---|---|
| On-SPOC 322 | Modem 321 | 1   323 | Driver ID A   324 | Peripheral ID A |
|  | Wi-Fi | 1 | Driver ID B | Peripheral ID B |
|  | BTLE | 1 | Driver ID C | Peripheral ID C |
| On-board 332 | Screen 331 | 1   333 |  | Peripheral ID D |
|  | Touch | 1 | Driver ID E   334 | Peripheral ID E |
|  | Camera | 2 | Driver ID F | Peripheral ID F |
|  | Microphone | 1 | Driver ID G | Peripheral ID G |
|  | Speaker | 1 | Driver ID H | Peripheral ID H |
| Off-board | Card Scanner | 1 | Driver ID J | Peripheral ID I |

METHOD AND APPARATUS FOR PREFETCHING PERIPHERAL DEVICE DRIVERS FOR SMART PHONES AND OTHER CONNECTED DEVICES PRIOR TO HLOS BOOT

BACKGROUND

1. Field

The following description relates generally to peripheral device drivers, and more particularly to prefetching peripheral device drivers for smart phones and other connected devices prior to high-level operating system (HLOS) boot.

2. Background

Current smart phones, and other wireless devices, may be configured such that each different smart phone model made by each smart phone manufacturer may use a different software environment, and may be associated with different peripherals—both on-board and connected via wired or wireless interface—even though all of the smart phones may be using the same high-level operating system (HLOS), such as ANDROID. As such, initial software provisioning for smart phones may require identifying and loading drivers for every possible peripheral, in a large number of peripheral categories, that may be associated with the phone at some point later in a manufacturing process. As a result, the initial software provisioning for these smart phones requires extensive engineering expertise, a large output of labor, and significant hardware and software resources.

Because it is not known prior to HLOS boot-up which of the possible universe of peripherals are actually associated with the smart phone, identifying and loading drivers "on-the-fly" may cause HLOS boot-up to be more complicated and slower than is preferable.

Furthermore, because an entire universe of drivers may be loaded on to a smart phone, and it is unclear which of the loaded drivers may be used by the HLOS, it is very difficult to provide for centralized management of the HLOS by an interested party such as, for example, a network carrier, a smart phone manufacturer, or software company associated with the HLOS, that wishes to provide an update, such as, for example, a security patch, to all of the phones running the particular HLOS regardless of the phone manufacturers and network to which the phones are subscribed.

As such, it is desired to provide for a simplified initial software provisioning process. It is also desired to provide for faster HLOS boot-up with lower power consumption. It is further desired to provide for central management and updates of a single HLOS across a wide variety of smart phones using the same HLOS, even on different carrier networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method for booting a user equipment is described. The method may include performing a device boot of the user equipment. The method may include configuring peripherals and associated drivers for the user equipment. The method may include booting a high-level operating system (HLOS). The configuring may occur before the booting of the HLOS.

In one aspect, an apparatus for booting a user equipment is described. The apparatus may include means for performing a device boot of the user equipment. The apparatus may include means for configuring peripherals and associated drivers for the user equipment. The apparatus may include means for booting a high-level operating system (HLOS). The configuring may occur before the booting of the HLOS.

In one aspect, a computer program product for booting a user equipment is described. The computer program product may include a computer-readable medium comprising code. The code may cause a computer to perform a device boot of the user equipment. The code may cause a computer to configure peripherals and associated drivers for the user equipment. The code may cause a computer to boot a high-level operating system (HLOS). The configuring may occur before the booting of the HLOS.

In one aspect, an apparatus for booting a user equipment is described. The apparatus may include a memory, a transceiver, and a processor. The processor may be configured to perform a device boot of the user equipment. The processor may be configured to configure peripherals and associated drivers for the user equipment. The processor may be configured to boot a high-level operating system (HLOS). The configuring may occur before the booting of the HLOS.

In one aspect, a method for loading peripheral device drivers for a user equipment is described. The method may include determining peripherals that can be associated with a user equipment. The method may include loading drivers for the determined peripherals. The loaded drivers may be associated with a high-level operating system (HLOS) architecture regardless of a type of user equipment on which the HLOS is provided.

In one aspect, an apparatus for loading peripheral device drivers for a user equipment is described. The apparatus may include means for determining peripherals that can be associated with a user equipment. The apparatus may include means for loading drivers for the determined peripherals. The loaded drivers may be associated with a high-level operating system (HLOS) architecture regardless of a type of user equipment on which the HLOS is provided.

In one aspect, a computer program product for loading peripheral device drivers for a user equipment is described. The computer program product may include a computer-readable medium comprising code. The code may cause a computer to determine peripherals that can be associated with a user equipment. The code may cause a computer to load drivers for the determined peripherals. The loaded drivers may be associated with a high-level operating system (HLOS) architecture regardless of a type of user equipment on which the HLOS is provided.

In one aspect, an apparatus for loading peripheral device drivers for a user equipment is described. The apparatus may include a memory, a transceiver, and a processor. The processor may be configured to determine peripherals that can be associated with a user equipment. The processor may be configured to load drivers for the determined peripherals. The loaded drivers may be associated with a high-level operating system (HLOS) architecture regardless of a type of user equipment on which the HLOS is provided.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatus for booting a user equipment, or terminal, such as a smart phone. In particular, the described aspects may allow a user equipment (UE) to configure peripherals associated with the UE before booting the UE high-level operating system (HLOS). Configuring the peripherals may include automatically or manually pre-loading, or pre-fetching, information related to drivers for each of the peripherals associated with the UE and making the driver information available to the HLOS by storing it, for example, in flash memory. Configuring peripherals, and pre-loading information about drivers associated with the peripherals, before booting the HLOS, may allow the HLOS to be simplified and to boot more quickly. Separating the configuration of peripherals and pre-fetching of driver information from the HLOS also may allow for central management and updates of the HLOS across a wide variety of UEs, on any number of networks, using the same HLOS. Such aspects also may provide for a simplified initial software provisioning process.

Figure 1:
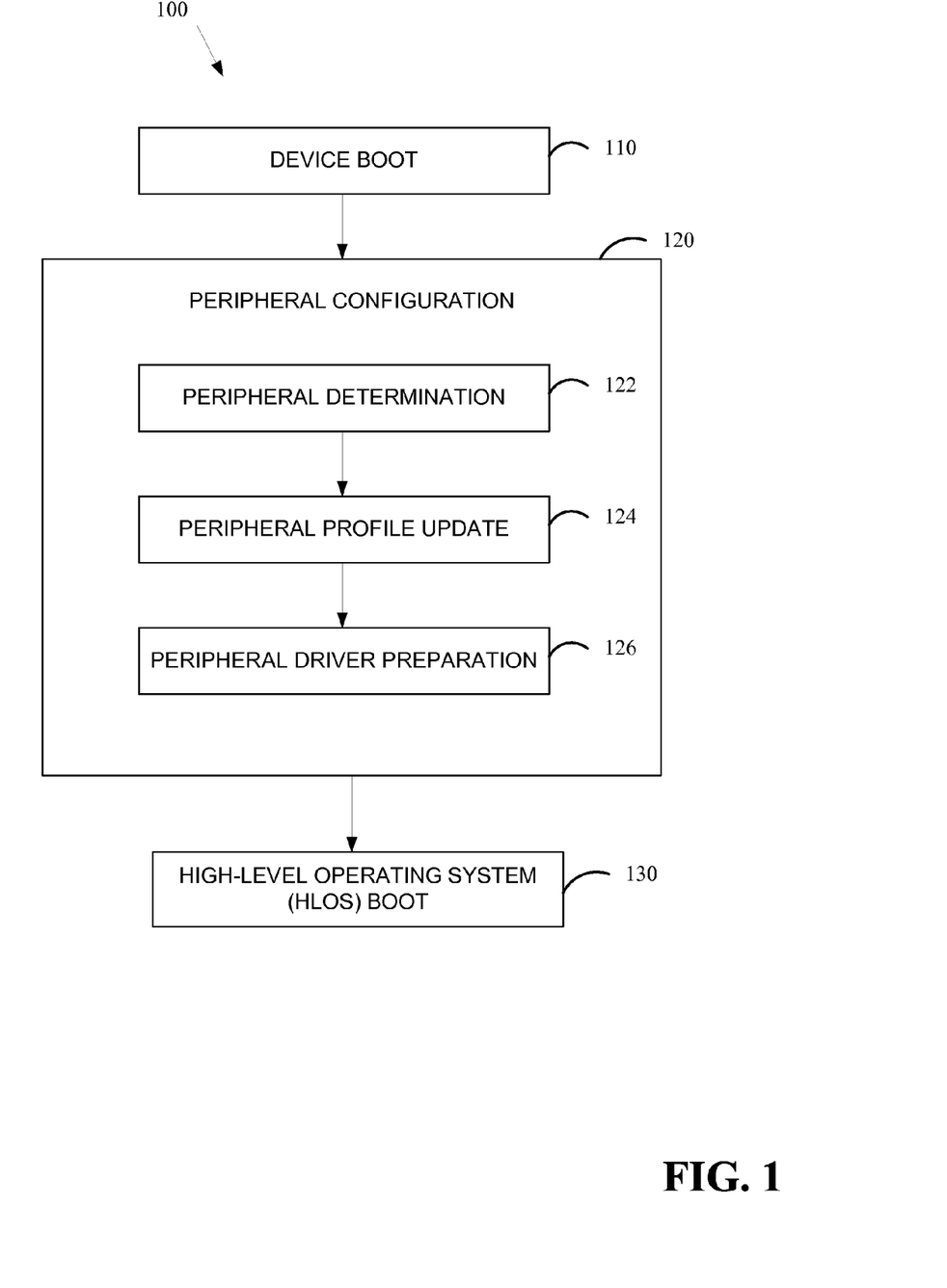
FIG. 1 is an illustration of an exemplary methodology for booting a user equipment.
Figure 8:
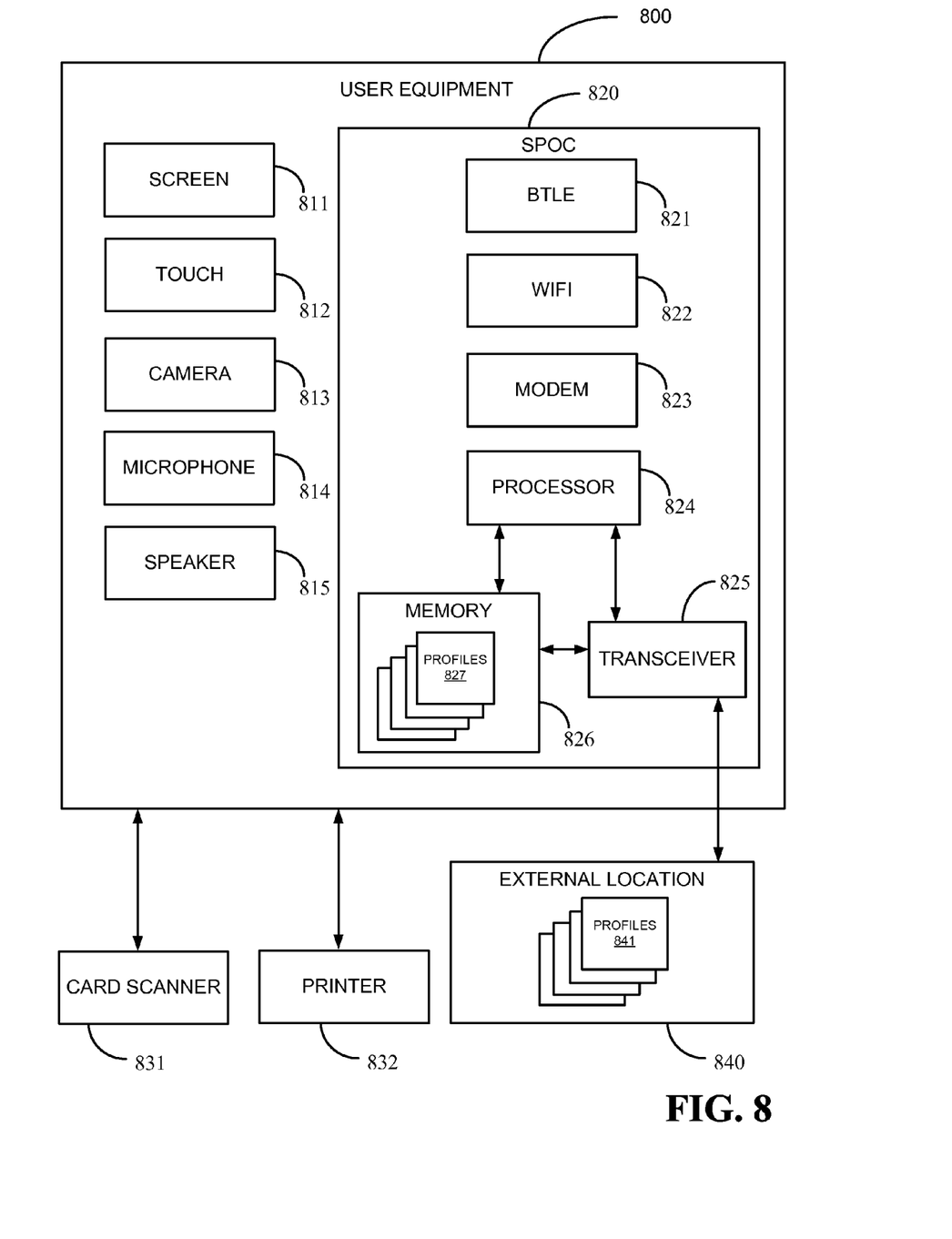
FIG. 8 is an illustration of an exemplary user equipment.

FIG. 1 is an illustration of an exemplary methodology 100 for booting a user equipment, such as, for example, UE 800 of FIG. 8. In one example, the method 100 may be performed by processor 824 of FIG. 8 in combination with memory 826 and transceiver 825 of FIG. 8.

At 110, the method 100 includes performing a device boot of the user equipment (UE). For example, the method 100 may perform a device boot of a UE, such as a smart phone. In some examples, the device boot may cause a pre-HLOS operating environment to load in order to perform later operations before a high-level operating system (HLOS) associated with the UE boots.

At 120, the method 100 includes configuring peripherals and associated drivers for the UE. In one aspect, the peripherals and associated drivers may be configured automatically. In another aspect, peripherals and associated drivers may be configured manually. In one example, the peripherals of the UE may be a smart phone on a chip (SPOC)-based peripheral (e.g., a peripheral, such as a processor or modem, integrated onto the SPOC), such as peripherals 821, 822, and 823 of FIG. 8, an on-board peripheral (e.g., a peripheral, such as a touch screen or camera, that is integrated into the UE but not as part of the SPOC), such as peripherals 811, 812, 813, 814, and 815 of FIG. 8, and/or an off-board peripheral (e.g., a peripheral, such as a printer or card scanner, connected to the UE via wired or wireless interface), such as peripherals 831 and 823 of FIG. 8. In one aspect, the peripheral configuration 120 may occur before, e.g., at a time prior to, HLOS boot-up.

In one aspect, and for example, drivers associated with the configured peripherals may be prefetched before the booting of the HLOS. In one example, the drivers may be prefetched by the pre-HLOS operating environment. In another aspect, the drivers may be activated before the booting of the HLOS. In one example, the drivers may be activated by the pre-HLOS operating environment. In another aspect, interim drivers associated with the configured peripherals may be identified by the UE and loaded. In one example, loading interim drivers associated with the configured peripherals may allow the UE to use the configured peripherals prior to HLOS boot. In another example, the pre-HLOS operating environment may identify and load the interim drivers. In another example, the interim drivers may be the same as, or different from, the drivers associated with the configured peripherals.

Peripheral configuration 120 may include peripheral determination 122, peripheral profile update 124, and peripheral driver preparation 126. At 122, the method 100 may include determining peripherals associated with the UE. More particularly, it may be determined whether a peripheral profile for each peripheral associated with the UE is available at the UE. In one example, it may be determined whether a profile for a particular peripheral has been pre-loaded into peripheral profile table, such as peripheral profile table 300 of FIG. 3, regardless of whether the particular peripheral is an on-SPOC, on-board, or off-board peripheral. A profile for a particular peripheral may be stored as an entry (for the particular peripheral) in peripheral profile table 300. In one example, the peripheral profile table, such as peripheral profile table 300 of FIG. 3 may be stored at the UE, such as UE 800 of FIG. 8, within a memory, such as memory 826 of FIG. 8.

Determining profiles associated with the UE also, in some instances, may include detecting whether a profile for each peripheral is complete. A complete profile may include all relevant information about the peripheral. For example, a complete profile may be represented by a table entry for which there is information in each field of the peripheral profile table. An incomplete profile may not include all relevant information about the peripheral. For example, an incomplete profile may be represented by a table entry for which there is information missing from one or more fields of the peripheral profile table.

Determining profiles associated with the UE also, in some instances, may include error-checking the profile for each peripheral. For example, all entries in the peripheral profile table may be error-checked to ensure that there the entries are useable by the HLOS. Errors that may be identified, and handled, may include, for example, integrity-based errors, profile entries that are outside a normal range, or a mistake (such as a typographical error) in an entry that may have been manually entered.

At 124, the method 100 includes updating a profile for each determined peripheral in a peripheral profile table. In the case of a complete profile, an associated entry in the peripheral profile table may not be updated because, for example, there was no missing information in the entry when it was determined by the UE. In the case of an incomplete profile, an associated entry in the peripheral profile table may be updated by the UE based on information about the determined peripheral.

Figure 3:
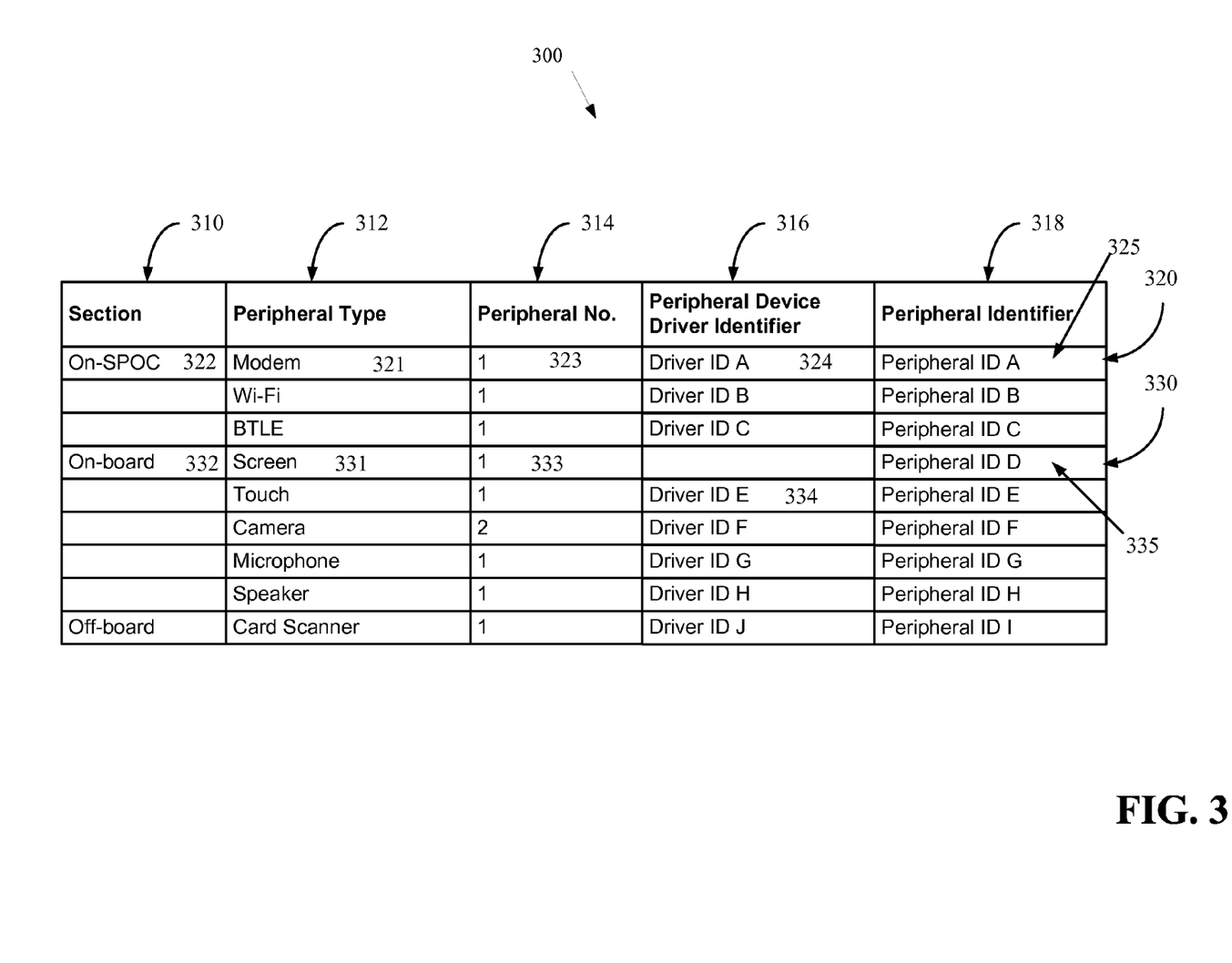
FIG. 3 is an illustration of an exemplary peripheral profile table.

At 126, the method 100 includes preparing drivers associated with each peripheral profile for use by the HLOS. In one example, driver preparation may include loading the now complete, updated, and error-checked peripheral profile table into flash memory or other storage medium that may be available to the HLOS. In one example, the peripheral profile table may be loaded into a memory, such as memory 826 of FIG. 8. Upon completion of 126, and access by the HLOS of the peripheral profile table, the HLOS may have received all of the information it may need about drivers associated with each of the peripherals determined to be associated with the UE.

At 130, the method 100 includes booting an HLOS. In one example, an HLOS associated with the UE boots up. In one example, the HLOS may use the results of the peripheral configuration at 120, such as the complete peripheral profile table 300 of FIG. 3, which has been stored as described above, to load drivers associated with each peripheral. Such pre-loading, or pre-fetching, of drivers may allow for an expedited and simplified HLOS boot-up process.

The methodology 100 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Figure 2:
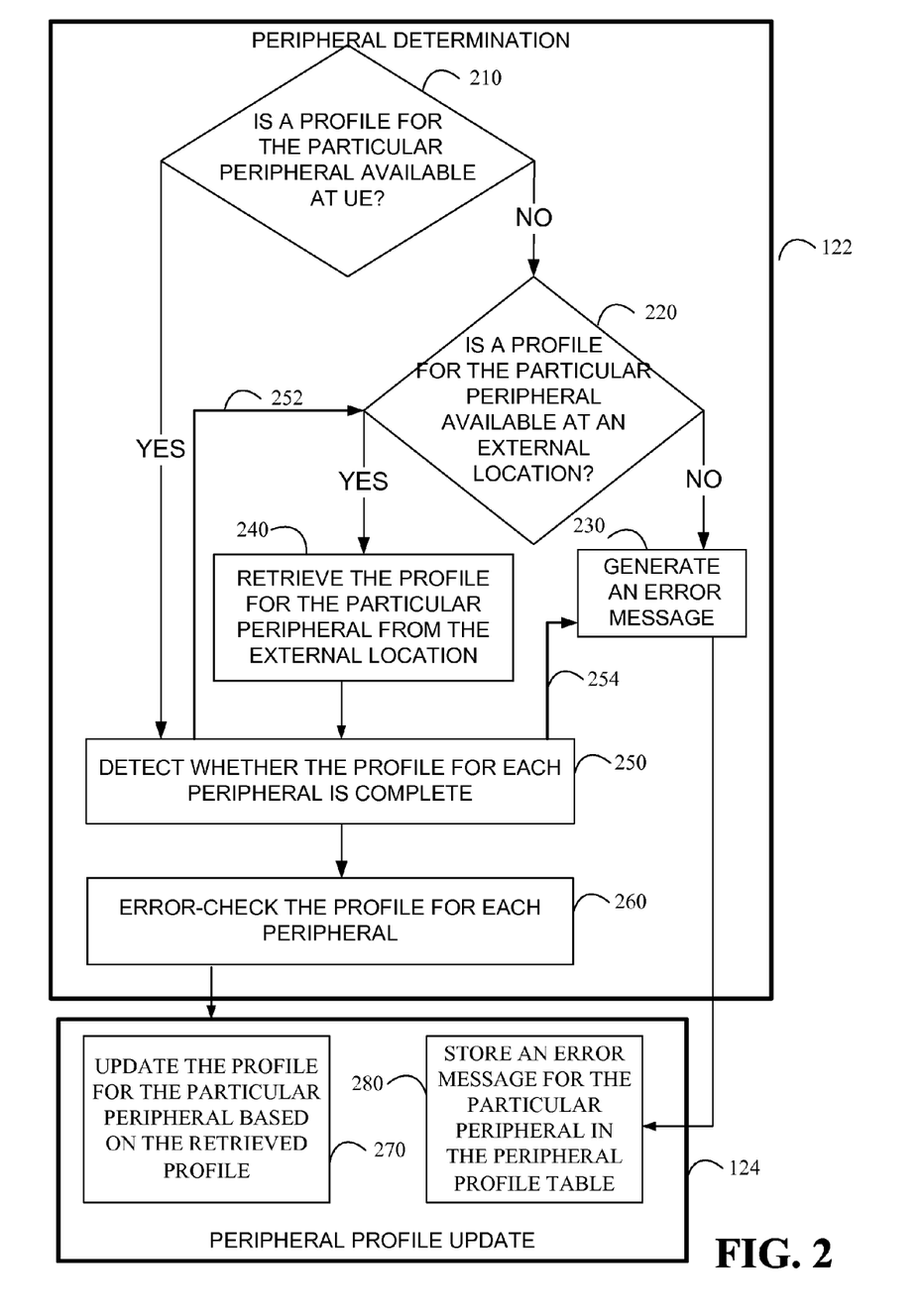
FIG. 2 is an illustration of an exemplary methodology for determining peripherals associated with a user equipment and updating a profile for each determined peripheral in a peripheral profile table.

FIG. 2 is an illustration of an exemplary methodology for determining peripherals associated with a user equipment and updating a profile for each determined peripheral in a peripheral profile table. More particularly, FIG. 2 provides additional, methodological details for 122 and 124 of FIG. 1. In one example, the aspects described herein with respect to FIG. 2 may be performed by processor 824 of FIG. 8 in combination with memory 826 and transceiver 825 of FIG. 8.

Determining peripherals associated with a UE, such as, for example, UE 800 of FIG. 8, as shown at 122, may include additional aspects 210, 220, 230, 240, 250, and 260 as shown in FIG. 2. At 210, the method 122 includes determining whether a profile for each peripheral is available at a UE. In one example, the peripherals may be peripherals 811, 812, 813, 814, 815, 821, 823, 831, and 832 of FIG. 8. A profile for a particular peripheral may be determined to be available at the UE if there is an entry (e.g., profile) for the particular peripheral within a peripheral profile table, such as peripheral profile table 300 of FIG. 3. Each entry in the peripheral profile table may be a profile for a particular peripheral.

If a profile for a particular peripheral is determined to not be available at the UE, the method 122 includes determining whether the profile for the particular peripheral is available at an external location, as shown at 220. In one example, a UE may search for a profile at a database, website, or other storage medium, created and/or managed by a manufacturer, or OEM, associated with the peripheral. For example, a UE may seek a profile for a display manufactured by Display Company A from a database of information (e.g., drivers) for Display Company A displays stored in the cloud, e.g. in a server available via a network such as the Internet, in a database controlled by Display Company A. If the UE determines that the profile is available at the external location, the method 122 includes retrieving the profile for the particular peripheral from the external location, as shown at 240.

If a profile for a particular peripheral is determined to not be available at the UE and not available at an external location, as shown at 230, the UE may handle the situation in one of several ways. In one example, the UE may generate an error associated with the particular profile, as shown at 230. In another example, the UE may generate, or create from scratch, a profile for the peripheral based on other information (not shown).

At 250, the method 122 includes detecting whether the profile for each peripheral is complete. For example, for each peripheral, which may have already been available at the UE or may have been retrieved from an external location, it may be detected whether the profile is complete. A profile may be detected as being complete if it is represented by an entry in a peripheral profile table for which there is information in each field of the entry. In other words, the profile is not missing any information. A profile may be detected as being incomplete if there is not information in each field of the entry. In other words, the profile is missing information.

If a profile for a particular peripheral is incomplete, and the profile was available at the UE, a complete profile for the particular peripheral may be sought at the external location, as shown by line 252. In other words, the methodology may move to 220 if an incomplete profile was available at the UE. If a profile for a particular peripheral is incomplete, and the profile was not available for retrieval from an external location, an error message may be generated, as shown by line 254. In other words, the methodology may move to 230 if an incomplete profile, or no profile, was retrieved from the external location. In another example, if an incomplete profile for a particular peripheral was retrieved from an external location, the methodology may move to 220, as shown by line 252, in order to attempt to retrieve a complete profile for the particular peripheral from an external location that may be different from the external location from which the incomplete profile was retrieved. In yet another example (not shown), if an incomplete profile is detected and the profile cannot be completed, a new profile for the peripheral may be generated, or created from scratch, based on information about the peripheral, and a new entry for the peripheral may be added to the peripheral profile table.

At 260, the method 122 includes error-checking the profile for each peripheral. For example, all entries in the peripheral profile table may be error-checked to ensure that there the entries are useable by the HLOS. Errors that may be identified, and handled, may include, for example, integrity-based errors, profile entries that are outside a normal range, or a mistake (such as a typographical error) in an entry that may have been manually entered.

Updating a profile for each determined peripheral in a peripheral profile table, such as peripheral profile 300 of FIG. 3, as shown at 124, may include additional aspects 270 and 280 as shown in FIG. 2. As shown at 270, the method 124 includes updating a profile for each determined peripheral in a peripheral profile table. In one example, if a profile that was available at the UE was adjusted based on detecting whether the profile was complete, completing the profile if necessary, and error-checking, and handling, the profile, the UE may access the original entry for the profile in the peripheral profile table, and update the entry based on the adjusted profile. In another example, if a profile for a particular peripheral was retrieved from an external location, the UE may access an entry in the peripheral profile table associated with the particular peripheral, if such an entry exists, and update the entry based on the retrieved profile. If an entry associated with the particular peripheral, for which a profile was retrieved from an external location, did not previously exist in the peripheral profile table, an entry will be created and information will be added to the entry based on the retrieved profile.

In one example, if a profile for a particular peripheral was neither available at the UE nor available at an external location, the method 124 includes storing an error message for the particular peripheral in the peripheral profile table, as shown at 230. In this case, and, for example, an error message may be generated, and then stored, in the peripheral profile table, or elsewhere, and associated with the particular peripheral, as shown at 280. If an error message is generated and stored in association with the particular peripheral, in one example, the HLOS may be alerted to the error upon entering its boot-up process, at 130.

In another example, the UE may attempt to generate, or create from scratch, a new profile for such a peripheral based on information about the peripheral. In this case, and for example, the methodology may move from 230 to 270 (not shown) in order to update the peripheral profile table by adding the newly-created profile for the particular peripheral.

The methodology 200 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

FIG. 3 is an illustration of an exemplary peripheral profile table 300. Peripheral profile table 300 is shown having fields including Section 310, Peripheral Type 312, Peripheral Number 314, Peripheral Device Driver Identifier 316, and Peripheral Identifier 318. In one example, each profile, or entry, in peripheral profile table 300, such as entries 320 and 330, may be entered manually such that the entry has been pre-populated and thus is complete when the UE determines the peripheral associated with the entry. In another example, an entry in peripheral profile table 300 may be auto-populated or generated based on the peripheral auto-configuration process described above with respect to FIGS. 1 and 2. Section 310 may relate to whether a particular peripheral is located on the SPOC, on-board the UE, or off-board. Peripheral Type 312 may indicate the type of peripheral associated with the entry, such as, for example, a modem, Wi-Fi, Bluetooth device, screen, camera, microphone, speaker, or card scanner. Peripheral Number 314 is an identifier based on the particular peripheral configuration. Peripheral Device Driver Identifier 316 may be manually entered in or automatically populated based on the Peripheral Identifier 318. In one example, Peripheral Identifier 318 may only be used (e.g., included in an entry) for those peripherals that will be auto-configured in order to determine the corresponding peripheral device driver to be used. In another example, Peripheral Identifier 318 may be used even if the Peripheral Device Driver Identifier 316 field has already been filled in.

A complete profile may include all relevant information about the peripheral. For example, a complete profile may be represented by a table entry for which there is information in each field of peripheral profile table. For example, entry 320 of FIG. 3, includes a profile for a modem. Entry 320 notes that the peripheral type is a modem 321, the modem is on the SPOC 322, has peripheral number 1 323, Driver ID A 324, and Peripheral ID A 325. An incomplete profile may not include all relevant information about the peripheral. For example, an incomplete profile may be represented by a table entry for which there is information missing from one or more fields in the peripheral profile table 300. For example, entry 330 of FIG. 3, includes a profile for a screen. Entry 330 notes that the peripheral type is a screen 331, the screen is on-board the UE 332 (e.g., integrated into the UE but not on the SPOC), has peripheral number 1 333, and Peripheral ID D 335. However, entry 330 is missing information related to a Driver ID 334 for the screen. As such, entry 330 is incomplete, and therefore, the UE may determine that a profile for the screen is not available at the UE.

In one aspect, the UE may be configured to load interim drivers associated with the determined peripherals before the booting of the HLOS. In one example, the interim drivers may be loaded, and used, by the pre-HLOS operating environment. In another example, the interim drivers may allow the UE (while running the pre-HLOS operating environment) to use the determined peripherals before the booting of the HLOS. In this case, an additional field may be included for each profile (or entry) in peripheral profile table 300 (not shown), which indicates whether an interim driver is available for a profile, whether the interim driver is available at the UE or elsewhere, whether the interim driver should be loaded by the UE prior to HLOS boot, and/or any other information related to the interim driver.

Figure 4:
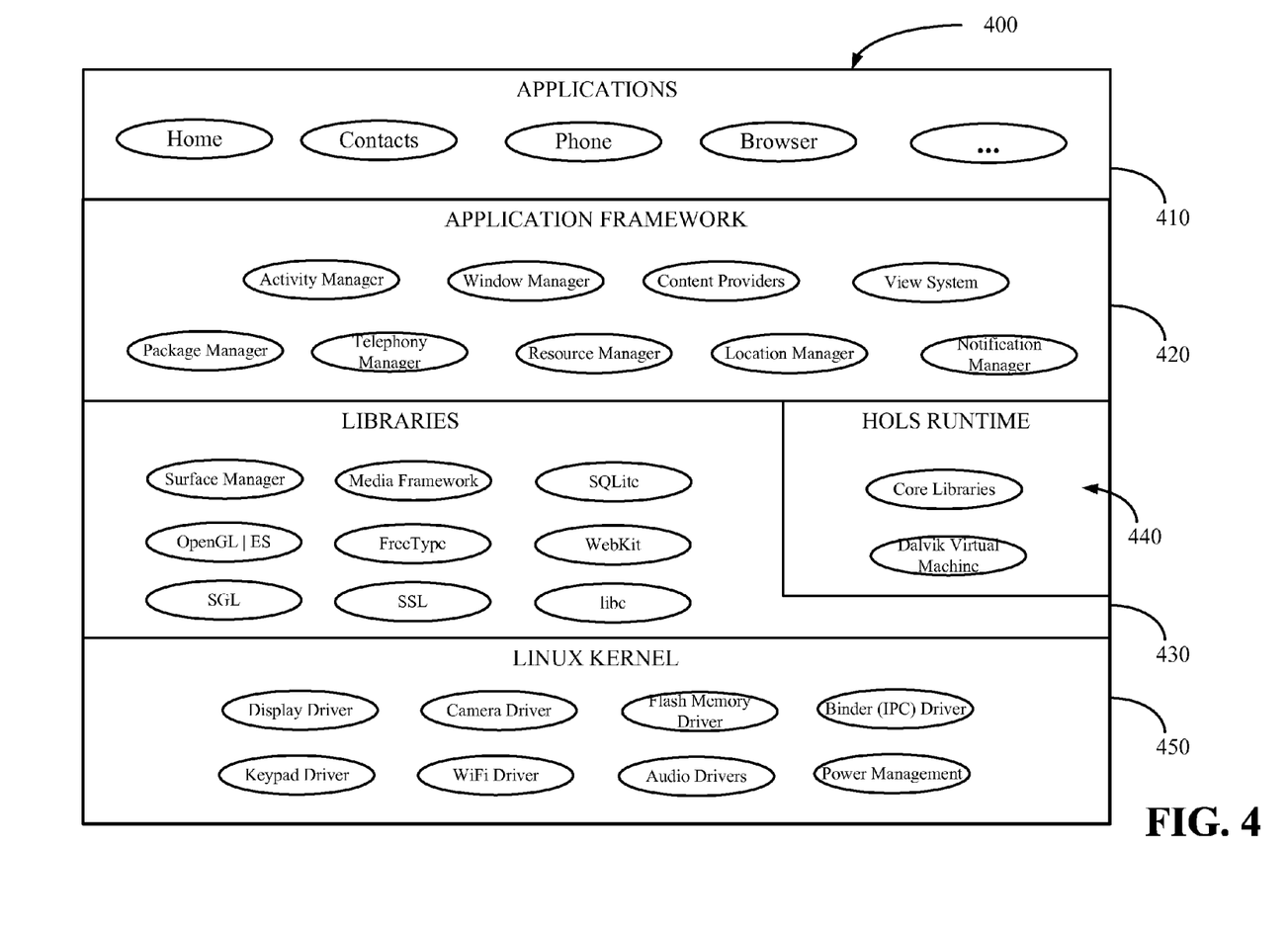
FIG. 4 is an illustration of an exemplary high-level operating system architecture.

FIG. 4 is an illustration of an exemplary high-level operating system architecture 400. The HLOS may be, in one example, but not limited to, an ANDROID operating system, although it should be understood that the HLOS may be any type of operating system. The HLOS may be running on a UE, such as UE 800 of FIG. 8 where a processor, such as processor 824 of FIG. 8, may be executing instructions associated with the HLOS where the instructions may be stored in a memory, such as memory 826 of FIG. 8. An architecture for the HLOS architecture 400 includes an application layer 410, application framework layer 420, libraries layer 430, HLOS runtime layer 440, which may be, for example, an ANDROID runtime layer, and a kernel layer 450, such as but not limited to a LINUX kernel layer. The aspects described above, with respect to FIGS. 1, 2, and 3, may relate to the lowest layer of HLOS architecture 400, such as, for example, the LINUX kernel layer 450, in that support for drivers associated with UE peripherals is provided for in LINUX kernel layer 450.

In one approach for a smart phone HLOS, device drivers may be built directly into the LINUX kernel providing a monolithic LINUX kernel with support for a particular, targeted phone configuration. In such an approach, each smart phone model may have its own special LINUX kernel and, thus, its own version of a particular HLOS. As such, a carrier network, or other interested entity, may have little control over the HLOS versions running on each of the available smart phone models. Such a scenario may provide for difficulties in providing coordinated rollouts of updated HOLS information or software, such as bug fixes, security patches, and operating system updates.

In order to help alleviate some of the issues described above, and provide for coordinated rollouts of HOLS updates, a single version of a LINUX kernel may be provided for use in a large number of smart phones across carrier networks and phone manufacturers. As such, HOLS control by a carrier network or other interested entity may be coordinated. A single version of a LINUX kernel may be provided using a monolithic approach and/or a dynamic approach. The HLOS of the described aspects may be any type of operating system. The ANDROID operating system, and its associated LINUX attributes, is just one example used for purposes of explanation. The present description is not limited to an ANDROID or LINUX implementation.

Figure 5:
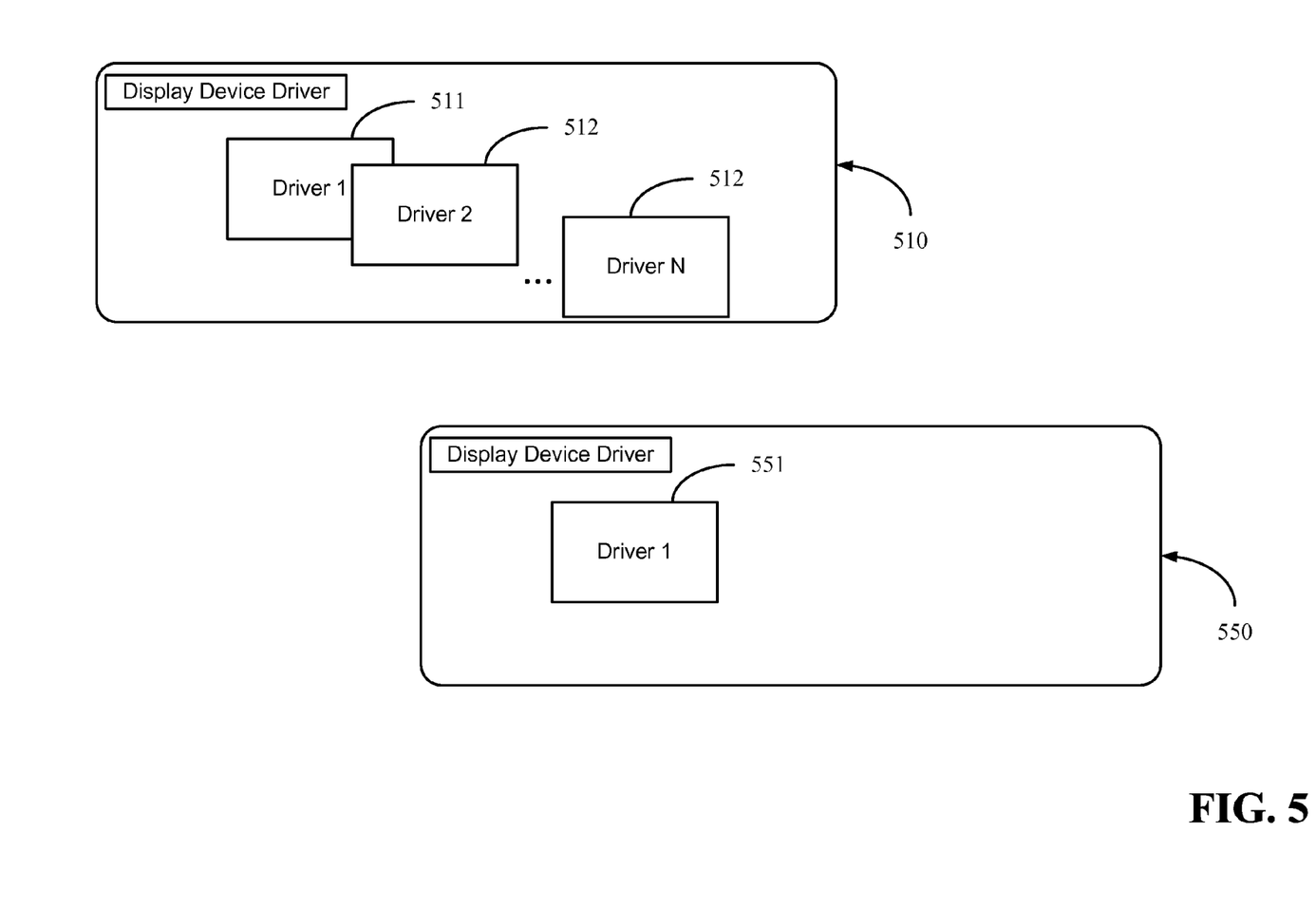
FIG. 5 is an illustration of exemplary display device drivers within Linux kernel layers.

FIG. 5 is an illustration of exemplary display device drivers within LINUX kernel layers. More particularly, FIG. 5 is an illustration of an exemplary display device driver within a monolithic LINUX kernel layer 510 and an exemplary display driver within a dynamic LINUX kernel layer 550. LINUX kernel layer 510 and 550 may be, for example, LINUX kernel layer 450 of FIG. 4.

Referring to 510, a monolithic kernel is provided, which may include one or more drivers associated with one or more known display peripherals, such as, for example, Driver 1, 511, Driver 2, 512, through the Nth Driver 513, where N is a positive integer. For example, drivers 511, 512, and 513 may be pre-loaded and built into the kernel in a monolithic, or single, release.

Referring to 550, a dynamic kernel is provided, which may include a single driver, such as, for example, Driver 1 551, associated with a display peripheral. Driver 1 551 may be loaded as a placeholder, such as a loadable kernel module (LKM). In one example, drivers loaded as LKMs may include only those drivers that are associated with a target HLOS that may be provided on a smart phone by the phone manufacturer at a later point in time. An LKM may be loaded as a placeholder for a driver for a peripheral in each of a plurality of peripheral categories. For example, a LKM may be loaded as a placeholder for a driver for a modem, a display, a camera, microphone, and other peripherals that may possibly be associated with the UE. Because Driver 1 551 may be an LKM, it may not be loaded as part of the base kernel release. Rather, the LINUX kernel may dynamically load Driver 1 551 based on the peripheral profile stored in, for example, peripheral profile table 300, for the particular display peripheral determined to be associated with the UE. In one example, the dynamic approach may allow for the LINUX kernel and device driver releases to be separately released and supported. The HLOS of the described aspects may be any type of operating system. The ANDROID operating system, and its associated LINUX attributes, is just one example used for purposes of explanation. The present description is not limited to an ANDROID or LINUX implementation.

Figure 6:
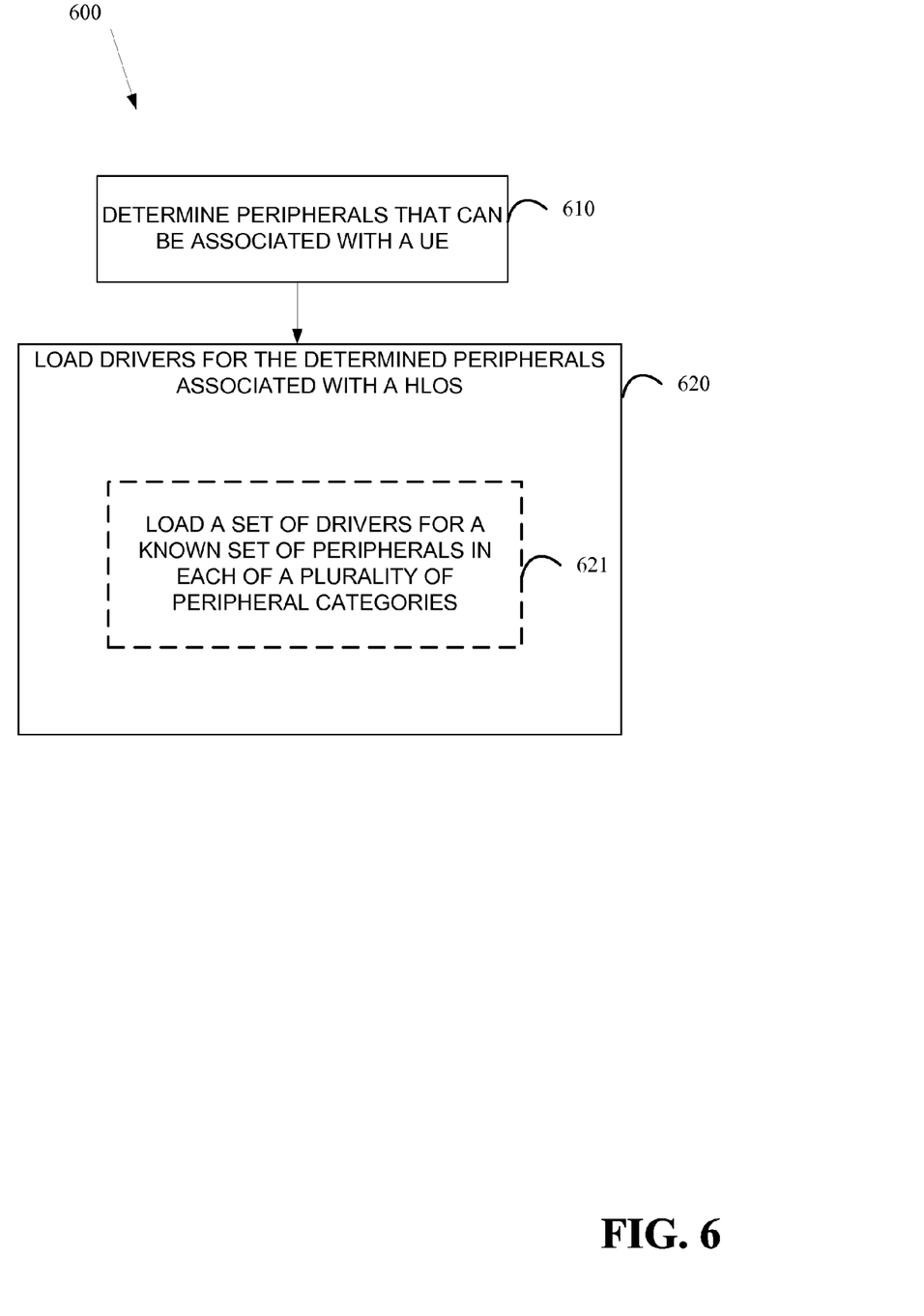
FIG. 6 is an illustration of an exemplary methodology for loading peripheral device drivers for a user equipment using a monolithic approach.

FIG. 6 is an illustration of an exemplary methodology 600 for loading peripheral device drivers for a user equipment using a monolithic approach. In one example, method 600 may be for loading peripheral device drivers for UE 800 of FIG. 8. In one example, the method 600 may be performed by processor 824 of FIG. 8 in combination with memory 826 and transceiver 825 of FIG. 8.

At 610, the method 600 includes determining peripherals that can be associated with a UE. Each of the determined peripherals may be, for example, located on the SPOC, on-board the UE, or off-board, such as, for example, peripherals 811, 812, 813, 814, 815, 821, 822, 823, 831, and 832 of FIG. 8.

At 620, the method 600 includes loading drivers for the determined peripherals such that the loaded drivers are associated with a HLOS architecture regardless of a type of UE on which the HLOS is provided. Drivers for the determined peripherals may be loaded, for example, into a LINUX kernel, such as LINUX kernel 450 of FIG. 4 or LINUX kernel 510 of FIG. 5. In one example, optionally, and as shown at 621, the method 600 includes loading a set of drivers for a known set of peripherals in each of a plurality of peripheral categories. In one example, one or more drivers for each of all known modems, or some large subset of all known modems, that may be associated with a UE, may be loaded, one or more drivers for each of all known displays, or some large subset of all known displays, that may be associated with a UE, may be loaded, and so on. The set of drivers may be pre-loaded and built into the kernel in a monolithic, or single, release.

The HLOS of the described aspects may be any type of operating system. The ANDROID operating system, and its associated LINUX attributes, is just one example used for purposes of explanation. The present description is not limited to an ANDROID or LINUX implementation.

The methodology 600 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Figure 7:
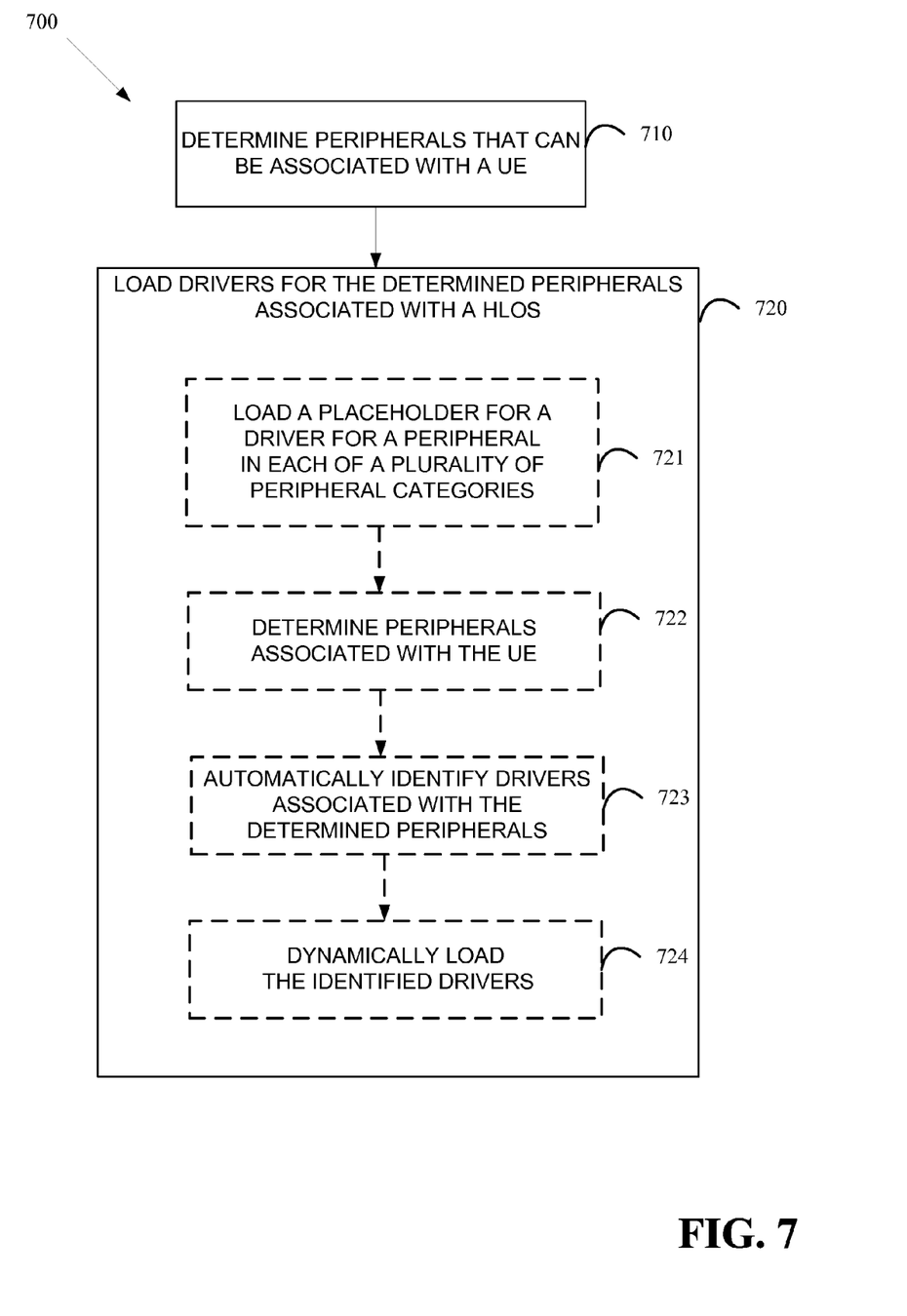
FIG. 7 is an illustration of an exemplary methodology for loading peripheral device drivers for a user equipment using a dynamic approach.

FIG. 7 is an illustration of an exemplary methodology 700 for loading peripheral device drivers for a user equipment using a dynamic approach. In one example, method 700 may be for loading peripheral device drivers for UE 800 of FIG. 8. In one example, the method 800 may be performed by processor 824 of FIG. 8 in combination with memory 826 and transceiver 825 of FIG. 8.

At 710, the method 700 includes determining peripherals that can be associated with a user equipment. Each of the determined peripherals may be, for example, located on the SPOC, on-board the UE, or off-board, such as, peripherals 811, 812, 813, 814, 815, 821, 822, 823, 831, and 832 of FIG. 8.

At 720, the method 700 includes loading drivers for the determined peripherals such that the loaded drivers are associated with a HLOS architecture regardless of a type of UE on which the HLOS is provided. In one example, drivers for the determined peripherals may be loaded into a LINUX kernel, such as LINUX kernel 450 of FIG. 4 or LINUX kernel 550 of FIG. 5. At 720, the method 700 optionally includes 721, 722, 723, and 724, as described below.

At 721, the method 700 includes loading a placeholder for a driver for a peripheral in each of a plurality of peripheral categories. In one example, a loadable kernel module (LKM) may be loaded as a placeholder for a driver for a peripheral in each of a plurality of peripheral categories. For example, an LKM may be loaded as a placeholder for a driver for a modem, a display, a camera, microphone, and other peripherals that may possibly be associated with the UE. In one aspect, LKMs may include only those drivers that are associated with a target HLOS that may be provided on a smart phone by the phone manufacturer at a later point in time.

At 722, the method 700 includes determining peripherals associated with the UE. For example, the UE may determine, as described above, for example, with respect to FIGS. 1, 2, and 3, the specific peripherals in each of the plurality of peripheral categories that are currently associated with the UE. For example, the UE may determine that a display manufactured by Display Company A is associated with the UE.

At 723, the method 700 includes identifying drivers associated with the determined peripherals. In the current example, drivers associated with the Display Company A display may be identified.

At 724, the method 700 includes dynamically loading the identified drivers. In the current example, the Display Company A display drivers may be dynamically loaded into the placeholder LKM within a LINUX Kernel, such as LINUX Kernel 450 of FIG. 4 or 550 of FIG. 5. Furthermore, and in another example, the drivers associated with the determined peripherals may be loaded based on peripheral profiles stored in, for example, a peripheral profile table, such as peripheral profile table 300 of FIG. 3, for the particular peripheral determined to be associated with the UE. In one example, the dynamic approach may allow for the LINUX kernel and device driver releases to be separately released and supported.

The HLOS of the described aspects may be any type of operating system. The ANDROID operating system, and its associated LINUX attributes, is just one example used for purposes of explanation. The present description is not limited to an ANDROID or LINUX implementation.

The methodology 700 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

FIG. 8 is an illustration of an exemplary user equipment (UE) 800. UE 800 may include a smart phone on a chip (SPOC) 820, which may include peripherals on the SPOC, such as, for example, Bluetooth low energy (BLE) module 821, WiFi module 822, and modem 823.

SPOC 820 may also include processor 824, transceiver 825, and memory 826. Processor 824 may be configured to carry out processing functions associated with one or more of components and functions described herein. Processor 824 may include a single or multiple set of processors or multi-core processors. Moreover, processor 824 may be implemented as an integrated processing system and/or a distributed processing system. In particular, processor 824 may be configured to perform aspects of the methodologies discussed above, and shown in FIGS. 1-3, 6, and 7.

In one example, processor 824 may be configured to determine whether a profile for a particular peripheral is available at the UE 820, as shown at 210 of FIG. 2. Processor 824 also may be configured to determine whether a profile for the particular peripheral is available at an external location, as shown at 220 of FIG. 2. Profiles may be available at an external location, such as, for example, a database, website, or other storage medium, created and/or managed by a manufacturer, or OEM, associated with the peripheral, as described above. If the profile is available at an external location, processor 824 may be configured to communicate with transceiver 825 and request that transceiver 825 contact an external location 840.

Transceiver 825 may be configured to establish and maintain communications with one or more entities utilizing hardware, software, and services as described herein. Transceiver 825 may carry communications between UE 800 and external devices, such as devices located across a communications network and/or devices serially or locally connected to UE 800. For example, transceiver 825 may include transmit chain components and receive chain components operable for interfacing with external devices.

In particular, transceiver 825 may communicate with external location 840 to determine if a profile for the particular peripheral is available at external location 840 among one of profiles 841 stored at external location 840. If it is, transceiver 825 may retrieve the profile from external location 840. Transceiver 825 may provide the retrieved profile to processor 824. Processor 824 may be configured to access memory 826, which may store individual profiles 827 and a peripheral profile table, such as peripheral profile table 300 of FIG. 3, to update the profile for the particular peripheral in the peripheral profile table based on the retrieved profile.

As discussed above, memory 826 may be configured to store data used herein and/or local versions of applications being executed by processor 824. For example, memory 826 may be configured to store peripheral profiles in, for example, a peripheral profile table, such as, peripheral profile table 300 of FIG. 3. Additionally, and in one example, memory 826 may include any type of memory usable by a computer, such as random access memory (RAM), read only memory (ROM), tapes, magnetic discs, optical discs, volatile memory, non-volatile memory, and any combination thereof. In one example, memory 826 may be a flash memory. Memory 826 may also include a data store (not shown), which can be any suitable combination of hardware and/or software, that provides for mass storage of information, databases, and programs employed in connection with aspects described herein. For example, a data store may be a data repository for applications not currently being executed by processor 824.

Processor 824, transceiver 825, and memory 826 may be configured to communicate with one another.

UE 800 also may include on-board peripherals, such as screen 811, touch module 812, camera 813, microphone 814, and speaker 815. FIG. 8 also shows off-board peripherals, such as card scanner 831 and printer 832, which may be connected to UE 800 via wired or wireless interface.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for booting a user equipment, comprising:
performing a device boot of the user equipment;
determining whether profiles for peripherals associated with the user equipment are available at the user equipment;
upon determining that a profile for one of the peripherals is not available at the user equipment but is available at a location external to the user equipment, the location being managed by a manufacturer associated with the one of the peripherals, retrieving the profile for the one of the peripherals from the location;
configuring the peripherals and associated drivers for the user equipment by at least updating the profile for the one of the peripherals based on the retrieved profile; and
booting a high-level operating system (HLOS), wherein the configuring makes information related to at least one driver associated with each of the peripherals available to the HLOS, and the configuring occurs before the booting of the HLOS.

2. The method of claim 1, further comprising prefetching the associated drivers for the user equipment before the booting of the HLOS.

3. The method of claim 1, wherein configuring the peripherals and associated drivers for the user equipment comprises activating the associated drivers before the booting of the HLOS.

4. The method of claim 1, further comprising:
identifying interim drivers associated with the configured peripherals; and
loading the interim drivers for use by a pre-HLOS operating environment to allow the user equipment to use the peripherals before the booting of the HLOS.

5. The method of claim 1, wherein configuring the peripherals and associated drivers comprises automatically configuring the peripherals and associated drivers.

6. The method of claim 1, wherein configuring the peripherals and associated drivers comprises manually configuring the peripherals and associated drivers.

7. The method of claim 1, wherein the configuring further comprises:
determining the peripherals associated with the user equipment;
updating a profile for each determined peripheral in a peripheral profile table; and
preparing drivers associated with each peripheral profile for use by the HLOS.

8. The method of claim 7, wherein determining the peripherals associated with the user equipment further comprises:
detecting whether a profile for each peripheral is complete; and
error-checking the profile for each peripheral.

9. The method of claim 7,
wherein updating the profile for the one of the peripherals comprises storing an error message for the one of the peripherals in the peripheral profile table.

10. An apparatus for booting a user equipment, comprising:
means for performing a device boot of the user equipment;
means for determining whether profiles for peripherals associated with the user equipment are available at the user equipment;
means for retrieving a profile for the one of the peripherals from a location external to the user equipment upon determining that the profile for one of the peripherals is not available at the user equipment but is available at the location external to the user equipment;
means for configuring the peripherals and associated drivers for the user equipment by at least updating the profile for the one of the peripherals based on the retrieved profile; and
means for booting a high-level operating system (HLOS), wherein the configuring makes information related to at least one driver associated with each of the peripherals available to the HLOS, and the configuring occurs before the booting of the HLOS.

11. A non-transitory computer-readable medium, comprising:
code for causing a computer to:
perform a device boot of a user equipment;
determine whether profiles for peripherals associated with the user equipment are available at the user equipment;
retrieve a profile for the one of the peripherals from a location external to the user equipment upon determining that a profile for one of the peripherals is not available at the user equipment but is available at a location external to the user equipment, the location being managed by a manufacturer associated with the one of the peripherals;
configure the peripherals and associated drivers for the user equipment by at least updating the profile for the one of the peripherals based on the retrieved profile; and
boot a high-level operating system (HLOS), wherein the configuring makes information related to at least one driver associated with each of the peripherals available to the HLOS, and the configuring occurs before the booting of the HLOS.

12. An apparatus for booting a user equipment, comprising:
a memory;
a transceiver; and
a processor configured to:
perform a device boot of the user equipment;
determine whether profiles for peripherals associated with the user equipment are available at the user equipment;
determine that a profile for one of the peripherals is not available at the user equipment but is available at a location external to the user equipment, the location being managed by a manufacturer associated with the one of the peripherals, wherein the transceiver is configured to retrieve the profile for the one of the peripherals from the location;
configure the peripherals and associated drivers for the user equipment by at least updating the profile for the one of the peripherals based on the retrieved profile; and
boot a high-level operating system (HLOS), wherein the configuring makes information related to at least one driver associated with each of the peripherals available to the HLOS, and the configuring occurs before the booting of the HLOS.

13. The apparatus of claim 12, wherein the processor is further configured to prefetch the associated drivers for the user equipment before the booting of the HLOS.

14. The apparatus of claim 12, wherein, to configure the peripherals and associated drivers for the user equipment, the processor is configured to activate the associated drivers before the booting of the HLOS.

15. The apparatus of claim 12, wherein the processor is further configured to:
  identify interim drivers associated with the configured peripherals; and
  load the interim drivers for use by a pre-HLOS operating environment to allow the user equipment to use the peripherals before the booting of the HLOS.

16. The apparatus of claim 12, wherein, the to configure the peripherals and associated drivers, the processor is configured to automatically configure the peripherals and associated drivers.

17. The apparatus of claim 12, wherein, to configure the peripherals and associated drivers, the processor is configured to manually configure the peripherals and associated drivers.

18. The apparatus of claim 12, wherein, to configure the peripherals and associated drivers, the processor is further configured to:
  determine the peripherals associated with the user equipment;
  update a profile for each determined peripheral in a peripheral profile table; and
  prepare drivers associated with each peripheral profile for use by the HLOS.

19. The apparatus of claim 18, wherein, to determine the peripherals associated with the user equipment, the processor is further configured to:
  detect whether a profile for each peripheral is complete; and
  error-check the profile for each peripheral.

20. The apparatus of claim 18, wherein the processor is configured to
  update the profile for the one of the peripherals by at least storing an error message for the one of the peripherals in the peripheral profile table.

* * * * *